United States Patent [19]

Cook

[11] 4,109,111

[45] Aug. 22, 1978

[54] METHOD AND APPARATUS FOR ESTABLISHING CONFERENCE CALLS IN A TIME DIVISION MULTIPLEX PULSE CODE MODULATION SWITCHING SYSTEM

[75] Inventor: Steven R. Cook, Columbia, Md.

[73] Assignee: Digital Switch Corporation, McLean, Va.

[21] Appl. No.: 827,093

[22] Filed: Aug. 23, 1977

[51] Int. Cl.² .............................................. H04M 3/56
[52] U.S. Cl. ................................................. 179/18 BC
[58] Field of Search ...................... 179/18 BC, 1 CN

[56] References Cited

U.S. PATENT DOCUMENTS

| | | | |
|---|---|---|---|
| 3,984,643 | 10/1976 | Inrig et al. | 179/18 BC |
| 4,022,991 | 5/1977 | Kelly et al. | 179/18 BC |
| 4,049,921 | 9/1977 | Zwack | 179/18 BC |
| 4,059,735 | 11/1977 | Betts | 179/18 BC |

Primary Examiner—Thomas W. Brown
Attorney, Agent, or Firm—Cushman, Darby & Cushman

[57] ABSTRACT

A pulse code modulation, time division multiplex conferencing system for providing to each party channel a signal indicative of the linear sum of the samples from all other party-channels, such signals are generated by accumulating the sum of all samples from all party-channels, then generating an output signal to a particular party channel by subtracting from the sum the contribution of the particular party-channel. The cumulative sum is updated upon receipt of each new sample. Provisions for conferencing channels in a plurality of sequentially aligned frames are also disclosed.

11 Claims, 3 Drawing Figures

METHOD AND APPARATUS FOR ESTABLISHING CONFERENCE CALLS IN A TIME DIVISION MULTIPLEX PULSE CODE MODULATION SWITCHING SYSTEM

FIELD OF THE INVENTION

The present invention relates to time division multiplex (TDM) communication systems in general, and, in particular, to conference call provisions in pulse code modulation (PCM) TDM communication systems.

BACKGROUND OF THE INVENTION

In time division multiplex communications, each of a plurality of channels utilizes a common communication transmission medium during a respective one of successive time intervals. The individual channels are sampled in a predetermined sequence and the samples are transmitted in sequence over the common medium. A sequence of corresponding samples from each individual channel is denoted a frame. In pulse code modulation (PCM) systems, such samples are in the form of a digital code, typically eight bits in length, derived from a nonlinear digitalization of a sample of the voice signal on the channel in accordance with a predetermined convention. In North America, a so-called T1 convention has been adopted, wherein a frame consists of samples from 24 channels. In Europe, a 32 channel system has been adopted (32 byte frame). The code (or byte) representative of the sample is typically 8 bits in length, the most significant bit of the byte being a sign bit, derived in accordance with a $\mu$-law (e.g., $\mu=255$) convention from a 14 bit linear digital representation of the sample, the most significant bit of the 14 also being a sign bit. Bit rates of on the order of 2.048 M bits/sec are typical.

Two party conversations are affected in a TDM system through a simple exchange of encoded speech signals, that is, the encoded samples from the respective party channels are transmitted during the time slot (interval) corresponding to the other channel. A problem, however, arises in TDM PCM systems when a conference call of three or more party channels is to be effected.

Various schemes for effecting such conference calls have been utilized in the prior art. For example, some prior art systems transmit to the respective party channels only the contents of that other party channel having the largest signal content. Examples of such systems are described in U.S. Pat. Nos. 3,908,089 issued Sept. 23, 1975 to Picandet and 4,007,338 issued Feb. 8, 1977 to McLaughlin. Other prior art systems, such as those described in U.S. Pat. Nos. 3,551,600 issued Dec. 29, 1970 to Berch and 3,984,643 issued Oct. 5, 1976 to Inrig, et al, accumulate the sum of all party channel samples during the course of a frame, then transmit in appropriate time slots a signal indicative of the sum of all party channel samples minus the contribution of the party channel corresponding to the particular time slot. In such systems, the samples in alternate frames are generally applied to first and second memories respectively, the previous frame being processed concurrently with the storage of the next successive frame. It should be appreciated that the accumulator is updated only upon the completion of a frame, that is, on a frame-by-frame basis.

SUMMARY OF THE INVENTION

The present invention provides for a conference call in a PCM TDM switching system wherein a signal indicative of the sum of all other party channels is transmitted to each respective party channel, wherein the accumulated sum is updated on a channel-by-channel, as opposed to frame-by-frame basis, thereby providing each output signal with less time delay, while requiring less hardware and storage than in the prior art systems. Each particular conference call is assigned to a particular location in an accumulator, and a code indicative of that accumulator location is loaded into respective locations in a control memory corresponding to each channel party to the particular conference call. As each byte of serial PCM data corresponding to a sample from a respective channel is received, the previous sample from that channel is subtracted from the content of the appropriate accumulator location, and the resultant difference loaded back into the accumulator and applied to a parallel to serial converter for output. The newly received sample is then loaded into an appropriate location in temporary memory corresponding to the respective channel, and is summed with the contents of the appropriate location in the accumulator. The resultant sum is then loaded into the accumulator location to update thereby the accumulator content.

BRIEF DESCRIPTION OF THE DRAWINGS

Preferred embodiments of the present invention will now be described in conjunction with the accompanying drawings in which.

DESCRIPTION OF THE PRESENTLY PREFERRED EXEMPLARY EMBODIMENT

Figure 1:
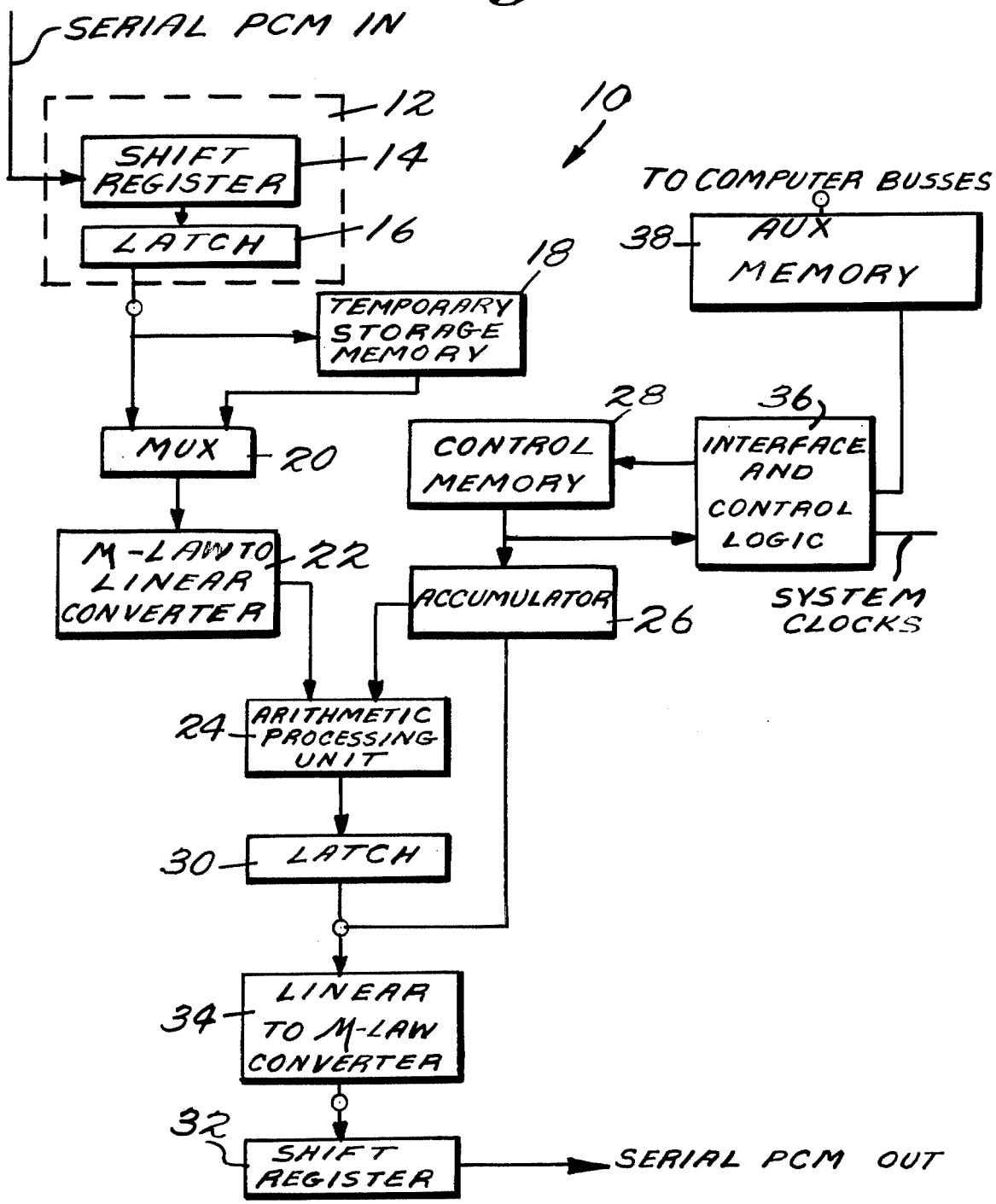
FIG. 1 is a block schematic of a PCM conference call system embodying the present invention.

Referring now to FIG. 1, a serial PCM data signal is applied to a conference circuit 10 embodying the present invention, and more particularly to a suitable serial-to-parallel converter 12 comprising a shift register 14 and latch 16. Latch 16 is coupled to a temporary storage memory 18, suitably a RAM, having a predetermined memory location corresponding to each respective time slot (channel) in a frame of the serial PCM data. Latch 16 is further coupled through a suitable multiplexer (MUX) 20 and, if the PCM data is compressed, through a suitable expander 22 ($\mu$-law to linear converter) such as a ROM, to a suitable arithmetic processing unit 24. Where MUX 20 is of the type including provisions for selective sign bit inversion, arithmetic unit 24 is suitably a binary adder, MUX 20 selectively flipping the sign bit of the byte passed therethrough to effect subtraction. Arithmetic unit 24 is also receptive of signals from an accumulator 26. Accumulator 26 includes a number of separate locations at least equal to the maximum number of conference calls to be simultaneously operated upon the system. Accumulator 26 communicates with a control memory 28, suitably a RAM. Control memory 28 also includes a respective predetermined location corresponding to each of the respective channels. The output of arithmetic unit 24 is applied to a conventional latch 30, the output terminals of which are connected to provide an input to accumulator 26 and to an output shift register 32. If the PCM data is companded, the output signal of latch 30 is applied to shift register 32 through a suitable compressor 34 (linear to μ-law converter) which may be built with simple logic elements as well known in the art. Timing and control signals to the various elements are provided by suitable interface and control logic 36 (connections not shown except to control memory 28). In general, control logic 36 is state of the art logic for addressing temporary storage 18 and control memory 28, controlling MUX 20, and providing timing signals, preferably in synchronism with the PCM input signal, to the remaining components of the circuit, to effect operation of the circuit as will be hereinafter described.

The signal outputted by system 10, to each respective party-channel is, as will be explained, indicative of the linear sum of the samples from all other party-channels. If the PCM data is companded, expander 22 and compressor 34 are necessary to compute such linear sum, then convert the sum into the compressed code. If companding techniques are not utilized, expander 22 and compressor 34 may be omitted.

Generally, in operation, a conventional central processing unit (CPU) (not shown) assigns an identity code to each call to be completed by the system, control logic 36 relates such code to a particular location in accumulator 26. The address of the location in accumulator 26 is then loaded into the respective locations in control memory 28 associated with each channel (time slot) party to that particular call (as indicated by the CPU). As the serial PCM data is received, it is temporarily stored on a byte-by-byte basis in converter latch 16. During the initial frame, the bytes corresponding to the signal content of each respective channel are loaded into the appropriate locations corresponding to the respective channel in temporary memory 18, and cumulative linear sums are developed in the associated location in accumulator 26 for each call.

In one exemplary mode of operation, as a new byte associated with a given channel ($n$) is received during subsequent frames, the contents of the temporary memory 18 location associated with that channel are subtracted from the accumulator 26 location associated with that channel and the difference loaded into the accumulator location to replace its previous contents and applied to parallel to serial converter 32 for output. When the entire byte is received, it is loaded into latch 16, and, while the next successive byte is being received, the contents of latch 16 are loaded into the temporary memory location associated with channel $n$ and are simultaneously summed with the contents of the accumulator location associated with channel $n$. The sum is stored in the associated accumulator location, replacing the previous contents. Thus, as each new sample from a given channel is received, the old channel sample is subtracted from the contents of the associated accumulator location and replaced by the new sample to update thereby the accumulator on a channel-by-channel, rather than frame-by-frame basis.

More specifically, as the serial bits comprising the byte indicative of the sample from channel $n$ are received, they are stored in sequence in shift register 14. Upon receipt of the seventh bit of the 8 bit sample (byte) from channel $n$, the temporary storage location corresponding to channel $n$ (hereinafter referred to as temporary storage location $n$) is read through MUX 20, into expander 22. The output of expander 22 and the content of the location in accumulator 26 indicated by the location in control memory 28 corresponding to channel $n$ (hereinafter control memory location $n$) are read into arithmetic unit 24, to effect the subtraction of the channel $n$ contribution from the cumulative sum. The resultant difference is temporarily stored in latch 30.

Upon receipt of the eighth bit of the sample from channel $n$, the contents of shift register 14, indicative of the new sample, are loaded into latch 16, to free shift register 14 for reception of the next successive byte (sample from channel $n+1$) in the PCM signal. Simultaneously, the contents of latch 30 are loaded into the accumulator location indicated by control memory location $n$, and are further applied through compressor 34 to output shift register 32. Shift register 32 thereafter outputs respective bits in synchronism with the receipt of each successive PCM input bit.

As the first and second bits of the sample from channel $n+1$ are received, control memory 38 is updated and interfaced with the central processor (not shown). As the third bit of the sample from channel $n+1$ is received, the contents of latch 16 (the sample from channel $n$) is loaded into temporary storage location $n$ and further applied through MUX 20 to expander 22. The output of expander 22 and the contents of the location in accumulator 26 indicated by the content of control memory location $n$ are read into arithmetic processor 24, and the resultant sum, indicative of the updated cumulative sum, is temporarily stored in latch 30. Upon receipt of the fourth bit of sample $n+1$, the contents of latch 26 are loaded into the accumulator location indicated by control memory location $n$. The processing cycle is thereafter repeated for channel $n+1$.

It should be appreciated that the immediately above-described procedure results in a one time slot displacement of the output signal to respective channels with respect to the input signal from the channel, that is, the sample from channel $n$ is outputted during the time slot assigned in the input signal to channel $n+1$. Such a displacement, however, is of little consequence in the overall operation of a time division switching system. The input and output channels are coupled to respective conventional time-division switches (not shown) which can easily be adapted to account for such a displacement, as is well known in the art.

A similar mode of operation can be utilized wherein the resultant output for a given channel is computed as the next successive byte is received, then outputted in synchronism with the second successive byte, resulting in a two time slot displacement of the output from the input. Again, such displacement is generally of little consequence in time-division switching systems.

An alternative mode of operation can be utilized to effect channel-by-channel updating of conference circuit 10 without resulting in the time slot displacement described above. In this alternative mode of operation, as in the previously described mode, during the initial frame, the bytes corresponding to the signal content of each respective channel are loaded into the appropriate locations corresponding to the respective channel in temporary memory 18, and cumulative linear sums are developed in the associated location in accumulator 26 for each call. Thereafter, as a new byte associated with a given channel $n-1$ is received, the contents of the temporary memory location associated with the next successive channel ($n$) are subtracted from the accumulator location associated with that channel and the difference applied to parallel to serial converter 32 for output during the next time slot (associated with channel $n$). The contents of the temporary location associated with channel $n-1$ are then subtracted from the contents of the accumulator location associated with channel $n-1$ and the sum loaded into the accumulator location to replace its previous contents. Thus, as each new sample from a given channel is received, the old channel sample is subtracted for the contents of the associated accumulator location and replaced by the new sample to update thereby the accumulator on a channel-by-channel rather than frame-by-frame basis.

More specifically, as the bit of the byte associated with a given channel $n-1$ (byte $n-1$) is received the content of temporary memory 18 location $n$ is applied, through MUX 20 to expander 22, and therefrom to arithmetic unit 24. Arithmetic unit 24 also has applied the contents of the location of accumulator 26 indicated by the contents of control memory location $n$, and effects a subtraction. The resultant difference, indicative of the sum of party channel contributions minus channel $n$'s contribution, is latched, and immediately applied through compressor 34 to output shift register 32. Thereafter, output shift register 32 generates output bits in synchronism with the receipt of each successive PCM bit (the new sample from channel $n$). Thus, the desired output sum of contributions of all party channels other than channel $n$ is generated during the time slot associated with channel $n$.

Upon receipt of the last bit of byte $n-1$, the contents of shift register 14 (the byte) is loaded into latch 16, to free shift register 14 for reception of the next successive byte (from channel $n$). As the first bit of the byte from channel $n$ is received, temporary storage 18 location $n-1$ is read through MUX 20 to expander 22 and therefrom into arithmetic unit 24. Simultaneously, the contents of the accumulator 26 location indicated by the contents of control memory 28 location $n-1$ is loaded into arithmetic unit 24. Arithmetic unit 24 then effectively subtracts from the sum the previous contribution to the sum from channel $n-1$. The resultant difference is temporarily stored in latch 30 until the receipt of the second bit of byte $n$ is received, whereupon the contents of latch 30 are loaded into the accumulator location indicated by control memory location $n-1$, replacing previous accumulation location contents. Control memory 28 is suitably updated by and interfaced with the CPU (not shown) during the next two (third and fourth) bits of byte $n$.

Upon receipt of the fifth bit of byte $n$, the contents of latch 16 are loaded into temporary storage location $n-1$ and through MUX 20 to expander 22, and therefrom to arithmetic unit 24, respectively. Simultaneously, the contents of the location of accumulator 26 indicated by control memory location $n-1$ are read into arithmetic unit 25, which effectively adds the new contribution of channel $n-1$ (contents of latch 16) into the cumulative sum for the conference. The resultant sum is temporarily stored in latch 30, and is loaded into the location of accumulator 25 indicated by control memory location $n-1$, upon receipt of the sixth bit of byte $n$. Thus, accumulator 26 is updated upon each new sample received. The cycle is then repeated, the contents of temporary storage location $n+1$ and the accumulator location indicated by control memory location $n+1$ being operated upon by arithmetic unit 24, to derive a difference to be outputted during the receipt of the new byte $n+1$, and so on.

It should be noted that the locations of control memory 28 are accessible to the CPU only during specific predetermined periods during the operational cycle. An auxiliary memory 38 can be included, effectively interposed between interface and control logic 36 and the CPU, to faciliate updating and interfacing between control memory 28 and the CPU. Auxiliary memory 38 stores information when received from the CPU in an appropriate location, and the contents of such location are transferred to the corresponding location of control memory 28 during the specific time period. Thus, the CPU time required by the system 10 can be reduced.

It should be appreciated that temporary memory 18, control memory 28, auxiliary memory 38 and accumulator 26 can be integrated in a single random access memory (RAM).

Figure 2A:
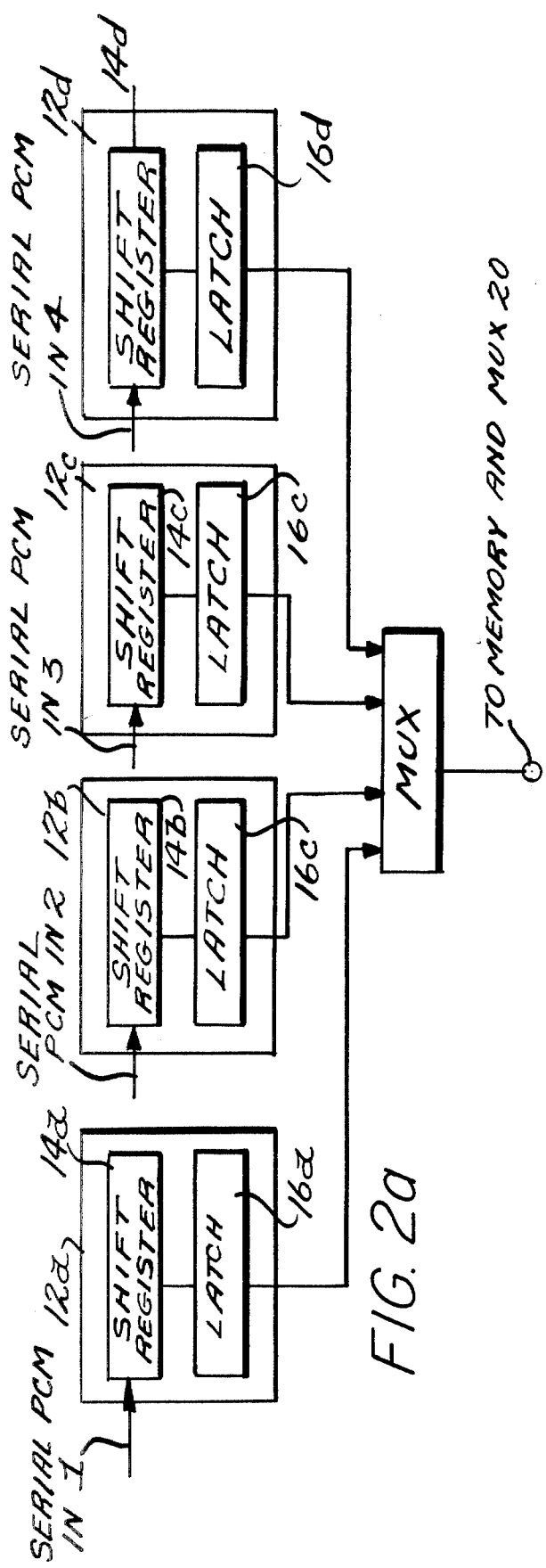
FIGS. 2a and 2b together provide a block schematic of the PCM conference call system of FIG. 1 adapted for use with plural aligned frames of data.
Figure 2B:
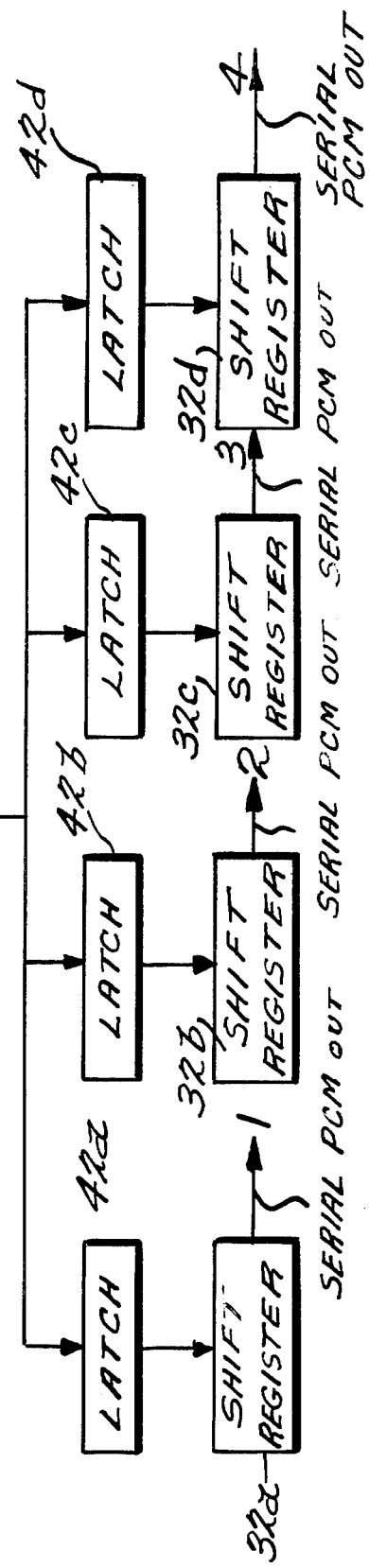

A conferencing circuit in accordance with the present invention can be expanded to provide conferences between channels transmitted over, for example, different media in plural synchronously aligned frames (e.g., channels 0-31 sampled in time slots 0-31 on transmission line 1, 32-63, sampled in time slots 0-31 on transmission line 2, etc.). A system adapted for providing conferencing between 128 channels, divided into four simultaneously sampled groups (frames) is shown in FIGS. 2a and 2b. Four serial to parallel converters 12a, 12b, 12c and 12d are coupled through a conventional MUX 40 to memory 18 and MUX 20 (FIG. 1). The output from compressor 34 is applied to four conventional latches 42a, 42b, 42c and 42d, respectively connected to four shift registers 32a, 32b, 32c and 32d. Serial to parallel converters 12a, 12b, 12c and 12d are respectively receptive of four corresponding aligned frames of serial PCM data. The arithmetic section of the circuit is suitably operated at a rate equal to the number of aligned frames (four) times the bit rate of the PCM data.

Serial to parallel converters 12a, 12b, 12c and 12d synchronously collect bits from bytes in corresponding time slots (contemporaneous bytes) and transfers to latches 16a–16d occur substantially simultaneously. The contents of the respective latches 16a–16d are time multiplexed in sequence to the processing circuitry. For example, during the first quarter of the processing cycle (last two bits of byte $n-1$), the results for the next byte in each of the frames is computed, and stored sequentially into latches 42a–42d, for output during the next time slot. During the last three quarters of the processing cycle (first six bits of byte $n$), the new sample in time slot $n-1$ in each of the frames is, in sequence, processed as previously described.

A conferencing system in accordance with the present invention can thus be expanded to any number of frames, the only practical limit being the speed of the arithmetic circuits.

An expanded conference system in accordance with the present invention can also be operated in a mode wherein the respective processing steps are not interleaved for the respective contemporaneous bytes, but rather wherein each contemporaneous byte is fully processed in sequence.

It should be noted that any embodiment of the above-described conferencing method requires for proper operation that the accumulator be initialized to zero before the initial conference may take place. This is easily accomplished by adding another bit to the control memory. In each step where the contents of latch 30 has been written into the accumulator location indicated by the contents of control memory, this additional bit can now determine whether the contents of latch 30 or a zero will be written. Thus, via this additional bit, the CPU may initialize any accumulator location.

Further, although the disclosed conference system and the associated switching system are generally four-wire devices (i.e., there are separate channels for voice going in each direction), current telephone local loops are often two-wire (i.e., a single wire pair carries voice to and from the telephone). The hybrid which interconnects the two-wire local loop to the four-wire switching system may introduce some reflection of the signal being sent to the local loop from the switch back into the channel coming from the local loop. When three or more parties are involved in a conference, the reflection of a party's signal at each of the other parties' hybrids can add and result in an oscillating condition. To prevent these oscillations from building up, it is often necessary to introduce attenuation when the number of parties gets up to about five. This can be placed under control of the CPU by adding yet another bit to the control memory.

Further, it should be noted, that while the various conductors shown interconnecting the elements of the drawing appear as single lines, they are not so shown in a limiting sense and may comprise plural connections as is understood in the art. It will be understood that the above description is of illustrative embodiments of the present invention, and that the invention is not limited to the specific form shown. Modifications may be made in the design and arrangement of the elements without departing from the spirit of the invention as will be apparent to those skilled in the art.

What is claimed is:

1. A time division multiplex communication system of the type wherein samples from a plurality of channels are represented as respective bytes of digital data, said bytes of data being combined to form a bit stream of sequential digital bits, bytes from respective ones of said plurality of channels occurring in said bit stream in a predetermined order, said system comprising:
   an accumulator;
   a memory having respective predetermined locations corresponding to each of said channels;
   means, responsive to said bit stream, for, upon occurrence of a byte from a respective channel of a predetermined group of channels, generating a difference signal indicative of the difference between a quantity indicative of the contents of the predetermined memory location corresponding to said respective channel and the contents of said accumulator;
   means, responsive to said difference signal for storing said difference in said accumulator to replace the previous contents of said accumulator;
   means, responsive to said difference signal, for generating an output byte indicative of said difference;
   means, responsive to said bit stream, for storing in the predetermined memory location corresponding to each particular channel each byte of said bit stream from that channel, each subsequent byte representative of a new sample from the particular channel replacing the previous contents of the predetermined memory location corresponding to the particular channel after the quantity indicative of the previous contents are subtracted from said accumulator contents;
   means for deriving the sum of the difference stored in said accumulator and a quantity indicative of said subsequent byte; and
   means for storing said sum in said accumulator to replace said difference.

2. In a TDM communication system of the type wherein a plurality of channels are sampled in a predetermined sequence and said samples are represented as sequential bytes of digital data, a system comprising:
   means for receiving said sequential bytes;
   a memory having a respective predetermined location corresponding to each of said channels;
   an accumulator;
   means, responsive to a received byte representative of a sample from any one of a predetermined group of channels for selectively generating a difference signal representing the difference between a quantity indicative of the contents of the memory location corresponding to the channel associated with said received byte and the contents of said accumulator;
   means, responsive to said difference signal, for storing said difference signal in said accumulator, replacing the previous contents of said accumulator;
   means, responsive to said difference signal, for generating an output byte indicative of said difference;
   means, responsive to said received byte, for storing said received byte in the predetermined memory location corresponding to the channel associated with said received byte to replace the previous contents of such predetermined location after the quantity indicative of the previous contents are subtracted from said accumulator contents;
   means for deriving the sum of the difference stored in said accumulator and a quantity indicative of said received byte; and
   means for storing said sum in said accumulator to replace said difference.

3. In a TDM communication system of the type wherein a plurality of channels are sampled in a predetermined sequence and said samples are represented as sequential bytes of digital data, a system comprising:
   an accumulator having respective locations, each location associated with respective predetermined groups of channels;
   means for sequentially receiving said successive bytes;
   temporary storage and control memories, each having a respective predetermined location corresponding to each of said channels;
   means for storing in each respective location of said control memory, indicia of the location in said accumulator corresponding to the group of channels to which the respective corresponding channel is a party; and
   means, responsive to a received byte representative of a sample from a respective channel, for subtracting a quantity indicative of the contents of said storage memory predetermined location corresponding to said respective channel from the contents of the accumulator location indicated by the control memory predetermined location corresponding to said respective channel; and generating a difference signal indicative of the difference therebetween, said difference signal being utilized as an output signal;
   means for storing said difference in said accumulator location indicated by said control memory location corresponding to said respective channel to replace the previous contents of said accumulator location;

means for sequentially storing said received byte in said storage memory predetermined location corresponding to said respective channel to replace the previous contents of said storage memory predetermined location, after the quantity indicative of the previous contents is subtracted from the indicated accumulator location contents;

means for deriving the sum of said difference in said indicated accumulator location and a quantity indicative of said received byte; and means for storing said sum in said indicated accumulator location to replace said difference.

4. The system of claim 3 wherein information regarding the channels party to said respective groups is supplied by a central processor and said control memory is receptive of update group information only during predetermined periods; and wherein further said means for storing indicia comprises:

an auxiliary memory interposed between said central processor and said control memory for temporarily storing said update group information and applying said information to said control memory during said predetermined periods.

5. The system of claim 3 adapted for response to plural input signals, each comprising aligned sequences of said bytes, wherein said means for receiving said successive bytes comprises:

means for temporarily storing respective contemporaneous bytes of said input signals; and multiplexing means for sequentially applying said bytes to said temporary storage memory and said means for deriving said sum.

6. In a time division switching system responsive to a digital bit stream comprising sequential bytes of binary data, each byte being indicative of the content of a respective associated channel, said system being of the type including means for receiving said sequential bytes, data and control memories, each having a respective predetermined location corresponding to each of said channels, an accumulator having a predetermined number of locations, and an output shift register, the method of conferencing a group of said channels comprising the steps of:

(a) storing in the respective control memory locations corresponding to each channel within said group of channels, indicia of a predetermined location in said accumulator;

(b) receiving said bytes in sequence;

(c) subtracting from the contents of the accumulator location indicated by the control memory location corresponding to the channel associated with each byte as received, a quantity indicative of the contents of the data memory location corresponding to said received byte;

(d) loading a quantity indicative of the resultant difference from step (c) into said output shift register and into said indicated accumulator location replacing the previous contents thereof;

(e) updating said control memory;

(f) subsequent to said subtraction step (c) loading said received byte into said data memory location corresponding to said received byte associated channel, replacing the previous contents of said data memory location; and adding a quantity indicative of said received byte to the difference contained in the accumulator location indicated by the control memory location corresponding to said received byte associated channel;

(g) loading said resultant sum into said indicated accumulator location; and (h) outputting the contents of said output shift register.

7. The method of claim 6 wherein said output shift register loading step (d) with respect to a difference associated with a given byte, is performed during the reception of the byte following said given byte, and said outputting step (h) is performed in synchronism with the reception of the second successive byte following said given byte.

8. The method of claim 6 wherein said output shift register loading step (d) with respect to a difference associated with a given byte, is performed during the reception of the byte preceding said respective byte and said outputting step (h) is performed in synchronism with reception of said given byte.

9. The method of claim 6 wherein said shift register loading step (d) with respect to a difference associated with a given byte, is performed during the reception of said given byte, and said outputting step (h) is performed in synchronism with the reception of the next successive byte after said given byte.

10. The method of claim 6 wherein said updating step (e) includes:

loading update information into an auxiliary memory; and loading the contents of said auxiliary memory into said control memory during a predetermined period.

11. In a time division switching system responsive to a purality of input signals, each input signal being a stream of serial bits comprising sequential bytes of binary data, each byte being indicative of the content of a respective associated channel, said input signal bytes being sequentially aligned, said system being of the type including means for receiving said input signals, and generating successive signals indicative of sets of contemporaneous bytes, data and control memories, each having a respective predetermined location corresponding to each of said channels, an accumulator having a predetermined number of locations, and respective output shift registers associated with each input signal; the method of conferencing a group of said channels comprising the steps of:

(a) storing in each of the control memory locations corresponding to respective channels in said group of channels, indicia of a predetermined location in said accumulator;

(b) storing simultaneously contemporaneous bytes from said respective input signals;

(c) sequentially subtracting from the contents of the accumulator location corresponding to the channel associated with each of said contemporaneous bytes, a quantity indicative of the contents of the data memory location corresponding to the respective byte and loading a quantity indicative of the resultant difference into the respective output shift registers associated with the respective input signals and into said indicated accumulator location replacing the previous contents thereof;

(d) updating said control memory;

(e) subsequent to said subtracting step (c), sequentially loading said respective contemporaneous bytes into said respective data memory locations corresponding to the respective bytes, replacing the previous contents thereof; and adding a quantity indicative of the respective byte to the differences contained in the respective accumulator locations indicated by the control memory locations corresponding to the respective bytes;

(f) sequentially loading the respective resultant sums from steps (e) into said respective indicated accumulator locations;

(g) outputting simultaneously the contents of said respective shift registers; and (h) repeating steps (b), (c), (d), (e), (f) and (g) for the next successive set of contemporaneous bytes.

* * * * *